(12) United States Patent
Han et al.

(10) Patent No.: US 12,328,528 B2
(45) Date of Patent: Jun. 10, 2025

(54) VIDEO RECORDING MANAGER DEVICE AND SYSTEM FOR REDUNDANT MOBILE VIDEO RECORDING

(71) Applicant: Digital Ally, Inc., Lenexa, KS (US)

(72) Inventors: Peng Han, Overland Park, KS (US); James W. Farnham, IV, Olathe, KS (US); Joshua L. Turner, Greenwood, MO (US); Douglas C. Fletcher, Lake Winnebago, MO (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

(21) Appl. No.: 18/588,114

(22) Filed: Feb. 27, 2024

(65) Prior Publication Data

US 2024/0195934 A1 Jun. 13, 2024

Related U.S. Application Data

(63) Continuation of application No. 17/746,466, filed on May 17, 2022, now Pat. No. 11,950,017.

(51) Int. Cl.
| | |
|---|---|
| *H04N 5/77* | (2006.01) |
| *H04N 7/01* | (2006.01) |
| *H04N 7/18* | (2006.01) |
| *H04N 23/661* | (2023.01) |
| *H04N 23/667* | (2023.01) |
| *H04W 12/06* | (2021.01) |
| *H04W 12/63* | (2021.01) |

(52) U.S. Cl.
CPC ............. *H04N 5/77* (2013.01); *H04N 7/0117* (2013.01); *H04N 7/188* (2013.01); *H04N 23/661* (2023.01); *H04N 23/667* (2023.01); *H04W 12/06* (2013.01); *H04W 12/63* (2021.01)

(58) Field of Classification Search
CPC ........ H04N 5/77; H04N 7/0117; H04N 7/188; H04N 23/661; H04N 23/667; H04W 12/06; H04W 12/63
See application file for complete search history.

(56) References Cited

U.S. PATENT DOCUMENTS

| | | | | |
|---|---|---|---|---|
| 10,390,732 | B2 * | 8/2019 | Ross | H04N 5/772 |
| 2012/0113265 | A1 * | 5/2012 | Galvin | H04N 23/661 |
| | | | | 348/E7.085 |
| 2016/0006922 | A1 * | 1/2016 | Boudreau | H04N 23/661 |
| | | | | 348/207.1 |
| 2018/0262724 | A1 * | 9/2018 | Ross | H04N 7/183 |

\* cited by examiner

*Primary Examiner* — Gevell V Selby
(74) *Attorney, Agent, or Firm* — Erise IP, P.A.

(57) ABSTRACT

Systems, methods, and computer-readable media are provided for redundantly storing and authenticating event related video data from one or more cameras using a video recording manager device. Additional copies of event related video data are persisted across various storage devices including any combination of internal camera storage, remote storage, and one or more storage mediums associated with the video recording manager device. The stored video data is augmented with authentication metadata to preserve the authenticity such that the video data is suitable as evidence.

20 Claims, 6 Drawing Sheets

FIG. 6

VIDEO RECORDING MANAGER DEVICE AND SYSTEM FOR REDUNDANT MOBILE VIDEO RECORDING

RELATED APPLICATION

This application is a continuation patent application of U.S. patent application Ser. No. 17/746,466, filed May 17, 2022, the disclosure of which is incorporated herein by reference.

TECHNICAL FIELD

Embodiments of the invention relate to video recording. More specifically, embodiments of the invention relate to redundant storage for mobile video recording.

Traditional video recordings lack the reliability to be properly authenticated and used as evidence in legal proceedings. Further, existing video recording systems fail to provide redundant storage of said video recordings, which makes the recordings vulnerable to tampering and loss. Further still, traditional video recordings fail to incorporate additional information associated with a triggering event, which would otherwise provide additional authentication and insight into the event.

SUMMARY

Embodiments of the invention solve the above-mentioned problems by providing systems, methods, and computer-readable media for storing and authenticating event related video data. Redundant storage of additional copies of event related video data provides further reliability and security, which, in some cases, makes the video data more suitable as evidence. Further, bi-directional communication between a video recording manager device and one or more cameras provides additional opportunities in terms of allocating recording and storage resources, as well as providing a control hierarchy for optimizing the security and reliability of recording operations.

In some aspects, the techniques described herein relate to a video recording authentication system for redundantly storing event related video data, the video recording authentication system including: one or more cameras configured to continuously record video data, wherein each of the one or more cameras includes an internal storage medium using a circular storage buffer for storing the continuously recorded video data; at least one sensor; and a video recording manager device communicatively coupled to the one or more cameras and the at least one sensor, the video recording manager device configured to transmit a triggering event signal to the one or more cameras based on a triggering event indication received from the at least one sensor, the video recording manager device including: a first storage medium storing triggering event related video data received from the one or more cameras, the triggering event related video data including at least a portion of the video data stored in the circular storage buffer recorded prior to receiving the triggering event indication and authentication metadata associated with the triggering event indication for authenticating the triggering event related video data; a second storage medium storing an additional copy of the triggering event related video data received from the one or more cameras, wherein the second storage medium is removable from the video recording manager device; and a wireless transceiver configured to transmit the triggering event related video data including the authentication metadata over a wireless network to a cloud-based storage system.

In some aspects, the techniques described herein relate to a video recording authentication system, wherein each of the one or more cameras, the at least one sensor, and the video recording manager device are mounted within a law enforcement vehicle.

In some aspects, the techniques described herein relate to a video recording authentication system, wherein the at least one sensor includes a proximity tag reader.

In some aspects, the techniques described herein relate to a video recording authentication system, wherein the authentication metadata is augmented to include proximity tag data indicative of an officer identifier associated with a law enforcement officer in proximity to the law enforcement vehicle.

In some aspects, the techniques described herein relate to a video recording authentication system, wherein the at least one sensor includes a GPS receiver and the authentication metadata further includes location information.

In some aspects, the techniques described herein relate to a video recording authentication system, wherein the one or more cameras include a body-mounted camera mounted on a law enforcement officer, the body-mounted camera including a wireless transceiver for communicating with the video recording manager device.

In some aspects, the techniques described herein relate to a video recording authentication system, wherein the internal storage medium of the one or more cameras includes a partitioned storage including a first portion associated with the circular storage buffer and a second portion for storing the triggering event related video data.

In some aspects, the techniques described herein relate to a method for redundantly storing event related video data, the method including: continuously recording video data using one or more cameras; storing the continuously recorded video data from the one or more cameras within an internal storage medium of each respective camera; receiving, via a video recording manager device, a triggering event indication from at least one sensor; responsive to receiving the triggering event indication, transmitting, via the video recording manager device, a triggering event signal to the one or more cameras, the triggering event signal initiating a triggering event recording procedure within each of the one or more cameras; receiving triggering event related video data from the one or more cameras into the video recording manager device, the triggering event related video data including at least a portion of the video data stored in the internal storage medium recorded prior to receiving the triggering event indication; storing the triggering event related video data within a first storage medium of the video recording manager device along with authentication metadata associated with the triggering event indication for authenticating the triggering event related video data; storing an additional copy of the triggering event related video data within a second storage medium of the video recording manager device along with the authentication metadata; and transmitting, from the video recording manager device, the triggering event related video data with the authentication metadata to a cloud-based storage system.

In some aspects, the techniques described herein relate to a method, further including: transmitting, from the video recording manager device, the authentication metadata to the one or more cameras to authenticate the video data stored in the internal storage medium of each respective camera.

In some aspects, the techniques described herein relate to a method, further including: preventing overwriting of the triggering event related video data on the internal storage medium of each of the one or more cameras before the triggering event related video data is stored by the cloud-based storage system.

In some aspects, the techniques described herein relate to a method, further including: receiving, at the video recording manager device, a confirmation message confirming storage of the triggering event related video data by the cloud-based storage system; and responsive to receiving the confirmation message, allowing overwriting of the triggering event related video data from the internal storage of each of the one or more cameras.

In some aspects, the techniques described herein relate to a method, further including: comparing the triggering event related video data to the additional copy of the triggering event related video data to authenticate the triggering event related video data as evidence.

In some aspects, the techniques described herein relate to a method, wherein the triggering event signal transmitted by the video recording manager device includes an instruction to adjust a set of recording parameters of the one or more cameras based at least in part on a type of the triggering event indication.

In some aspects, the techniques described herein relate to a method, wherein the set of recording parameters includes a video resolution, a frame rate, and a shutter speed.

In some aspects, the techniques described herein relate to one or more non-transitory computer-readable media storing computer-executable instructions that, when executed by at least one processor, perform a method for redundantly storing event related video data, the method including: continuously recording video data using one or more cameras; storing the continuously recorded video data from the one or more cameras within an internal storage medium of each respective camera using a circular storage buffer; receiving, via a video recording manager device, a triggering event indication from at least one sensor; responsive to receiving the triggering event indication, transmitting, via the video recording manager device, a triggering event signal to the one or more cameras, the triggering event signal initiating a triggering event recording procedure within each of the one or more cameras; receiving triggering event related video data from the one or more cameras into the video recording manager device, the triggering event related video data including at least a portion of the video data stored in the circular storage buffer recorded prior to receiving the triggering event indication; storing the triggering event related video data within a first storage medium of the video recording manager device along with authentication metadata associated with the triggering event indication for authenticating the triggering event related video data; and storing an additional copy of the triggering event related video data within a second storage medium of the video recording manager device along with the authentication metadata.

In some aspects, the techniques described herein relate to a computer-readable media, further including: transmitting, from the video recording manager device, the triggering event related video data with the authentication metadata to a cloud-based storage system.

In some aspects, the techniques described herein relate to a computer-readable media, further including: responsive to the triggering event signal, transferring the one or more cameras from a standard continuous recording mode into a triggering event recording mode.

In some aspects, the techniques described herein relate to a computer-readable media, wherein the triggering event recording mode is associated with an updated set of video recording parameters for increasing a video quality of the triggering event related video data compared to the standard continuous recording mode.

In some aspects, the techniques described herein relate to a computer-readable media, wherein the standard continuous recording mode is associated with a pixel resolution of 720p and the triggering event related video data is associated with a pixel resolution selected from the set consisting of 1080p and 4K.

In some aspects, the techniques described herein relate to a computer-readable media, wherein the circular storage buffer includes a temporary first-in-first-out storage procedure operable to store up to 168 hours of video data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
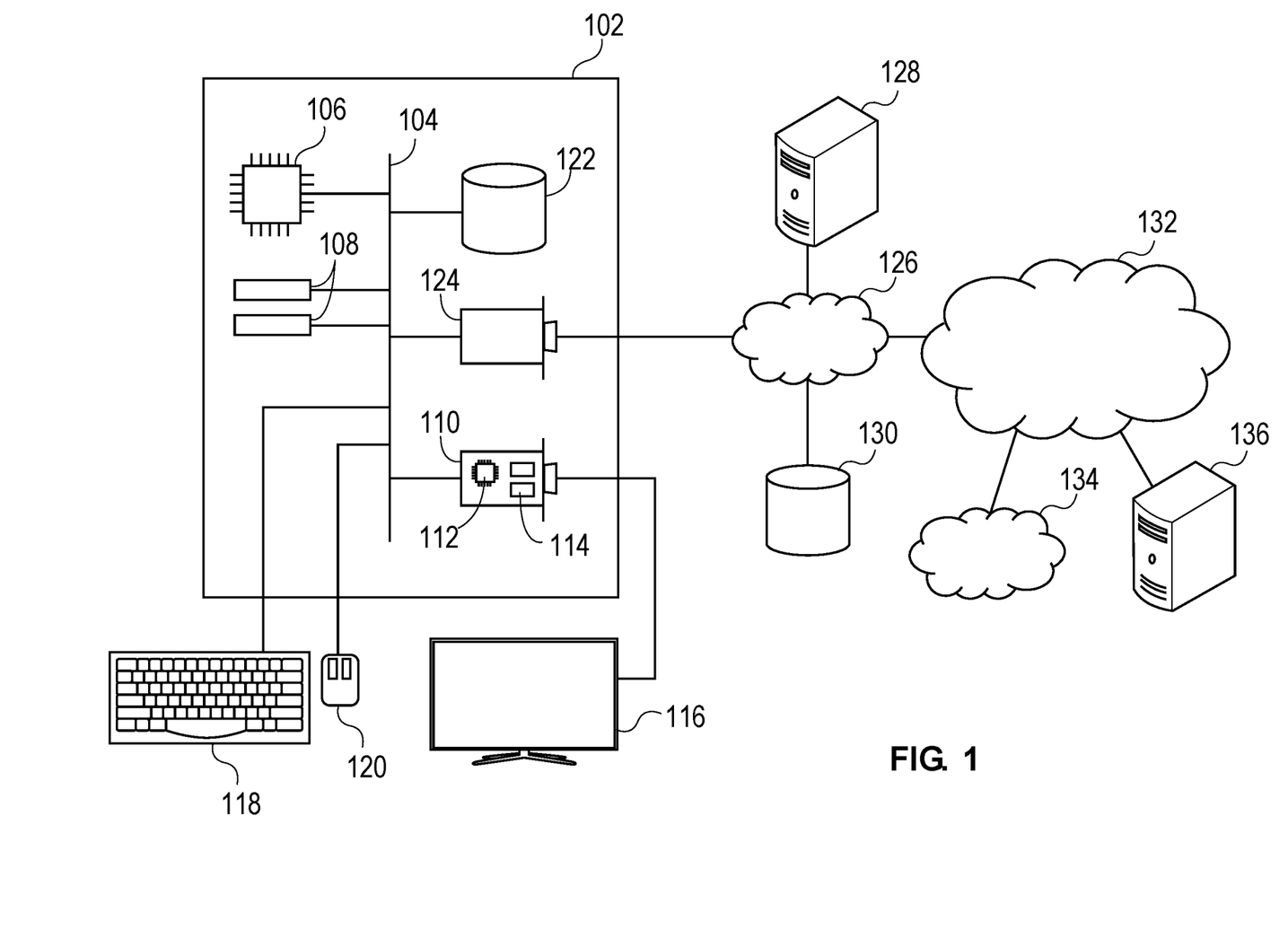
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is the central processing unit CPU 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and non-volatile media, removable and nonremovable media, and contemplate media readable by a database, as well as transitory and non-transitory forms of media. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
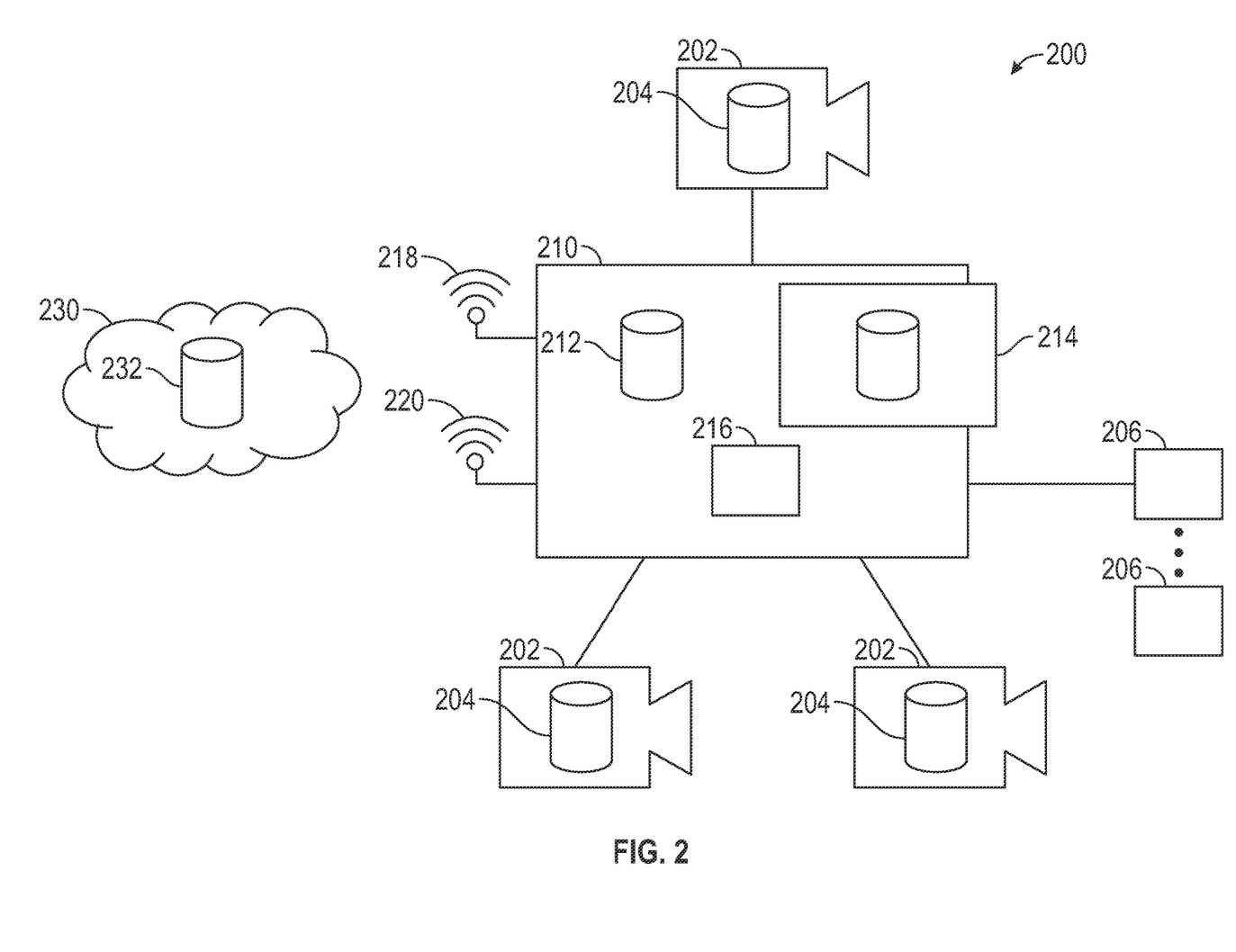
FIG. 2 depicts an exemplary video recording authentication system relating to some embodiments of the invention.

Turning now to FIG. 2, one example of a video recording authentication system 200 is depicted relating to some embodiments of the invention. In some embodiments, the video recording authentication system 200 comprises one or more cameras 202. In some embodiments, the one or more cameras 202 may comprise any combination of video cameras, still cameras, and microphones. For example, in some embodiments, the one or more cameras comprises a video camera configured to record both video and audio data. In some embodiments, the one or more cameras 202 may comprise mobile battery-powered cameras. Alternatively, or additionally, the one or more cameras 202 may be powered or charged from an external power source. For example, if the one or more cameras 202 are installed within a vehicle they may be electrically connected to the vehicle electrical systems such that the one or more cameras 202 may receive power from a vehicle battery of the vehicle. In some embodiments, each of the one or more cameras comprises an internal storage medium 204, as shown. Accordingly, the internal storage medium 204 may be configured to store video data captured by each respective camera of the one or more cameras 202. It should be understood that in some embodiments, each respective camera of the one or more cameras 202 comprise a video camera and that said video camera may further include one or more microphones such that the video camera is configured to capture both audio data and video data.

In some embodiments, the one or more cameras 202 are adapted to various different recording environments. For example, the one or more cameras 202 may be adapted to operate at a wide temperature range such that video recording quality is not affected by extreme temperatures. Additionally, the one or more cameras 202 may be suitable for recording under extreme vibration and other physically challenging recording circumstances. In some embodiments, at least one of the one or more cameras 202 may comprise a vibration dampening mounting structure which reduces vibration to increase recording quality. Further, in some embodiments, various software techniques may be used on the backend to remove vibration effects from video data. For example, an optical tracking algorithm may be applied to remove vibration effects after the video data has been recorded.

In some embodiments, the video recording authentication system 200 further comprises a sensor 206 or a plurality of such sensors. In some embodiments, the sensor 206 comprises any of a radio frequency identifier (RFID) tag reader, an accelerometer, a global positioning system (GPS) receiver, a motion sensor, an acoustic sensor, a pressure sensor, or other suitable types of sensors. Embodiments are contemplated in which the sensor 206 may be incorporated into one of the one or more cameras 202. For example, in some embodiments, the sensor 206 comprises an RFID tag reader disposed on or within at least one of the one or more cameras 202.

In some embodiments, the video recording authentication system 200 comprises a video recording manager device 210, as shown, for managing one or more sets of video data from the one or more cameras 202. Accordingly, in some embodiments, the video recording manager device 210 may be communicatively coupled to the one or more cameras 202. In some such embodiments, any combination of wired and wireless communication connections are contemplated. For example, in some embodiments, a BLUETOOTH wireless connection may be established between at least one of the one or more cameras 202 and the video recording manager device 210. Additionally, in some embodiments, a wired connection may be established, for example, using a USB or Ethernet connection, to transmit signals between the video recording manager device 210 and the one or more cameras 202.

In some embodiments, the communication connection between the video recording manager device 210 and the one or more cameras 202, whether wired or wireless, allows for video data captured from the one or more cameras 202 to be transmitted to the video recording manager device 210 and control signals to be communicated from the video recording manager device 210 to the one or more cameras 202. Further, embodiments are contemplated in which control signals may additionally be transmitted from the one or more cameras 202 to the video recording manager device 210. Accordingly, the communication connection may be established such that bidirectional communication is supported between the video recording manager device 210 and the one or more cameras 202. The bidirectional communication connection between the video recording manager device 210 and the one or more cameras 202 allows both control and data signals to be transmitted back and forth from the one or more cameras 202. Accordingly, embodiments are contemplated in which the video recording manager device 210 provides control signals for controlling recording operations of the one or more cameras 202 based at least in part on data signals received from the one or more cameras 202. Further still, the video recording manager device 210 may monitor parameters of the one or more cameras 202 such as, for example, battery life, remaining storage capacity, recording quality, as well as other camera-specific parameters.

In some embodiments, the video recording manager device 210 comprises a first storage medium 212 and a second storage medium 214 disposed within the video recording manager device 210. In some such embodiments, the first storage medium 212 and the second storage medium 214 are configured to store video data captured by the one or more cameras 202 in addition to related metadata, as will be described in further detail below. In some embodiments, at least one of the storage mediums may be removable from the video recording manager device 210. For example, in some embodiments, the second storage medium 214 is removably mounted within or onto the video recording manager device 210. In one example, the second storage medium 214 comprises a removable USB flash memory device, an SD card, or the like, such that the second storage medium 214 may be added and removed from the video recording manager device 210 to physically transfer the contents of the second storage medium 214, which as described above may include video data captured by the one or more cameras 202.

In some embodiments, the video recording manager device 210 further comprises a controller 216 disposed within the video recording manager device 210. In some embodiments, the controller 216 is configured to control the operation of the video recording manager device 210. For example, the controller 216 may monitor data received from the one or more cameras 202 and the sensor 206 to determine instructions to be sent to the one or more cameras 202 and to further instruct storage of data on the first storage medium 212 and the second storage medium 214. In some embodiments, the controller 216 further instructs storage on the internal storage medium 204 of each respective camera of the one or more cameras 202. In some embodiments, the controller 216 monitors a signal received from the sensor 206 to determine a triggering event. For example, in some embodiments, the sensor 206 may provide a signal including a triggering event indication which initiates a triggering event procedure of the video recording manager device 210.

In some embodiments, a number of different types of triggering events are contemplated including a variety of manually and automatically initiated triggers. For example, in some embodiments, a triggering event may be initiated by a law enforcement officer of other user performing any of a number of actions such as flashing lights, braking, activating sirens of a law enforcement vehicle, as well as driver monitoring parameters such as, using a cell phone, not wearing a seatbelt, or falling asleep. Further, in some embodiments, triggering events may be initiated based on vehicle-specific parameters such as lane departer and following too close to another vehicle, as well as other vehicle-specific parameters such that instances of traffic accidents may be recorded as event-related video data.

In some embodiments, the video recording manager device 210 further comprises a wireless transceiver 218 that may be internal or external to the video recording manager device 210. In some such embodiments, the wireless transceiver 218 may comprise a radio transceiver for receiving and transmitting radio waves. Additionally, in some embodiments, the video recording manager device 210 comprises a Wi-Fi transceiver 220 that may be internal or external to the video recording manager device 210. Here, the Wi-Fi transceiver 220 may be configured to wirelessly transmit and receive Wi-Fi signals over a network. Embodiments are contemplated in which either of the wireless transceiver 218 or the Wi-Fi transceiver 220 may be used to establish communication with the one or more cameras 202 and/or the sensor 206. Alternatively, or additionally, in some embodiments, as described above, the one or more cameras 202 and the sensor 206 may be communicatively coupled via a wired connection. Further still, embodiments are contemplated in which a devoted wireless connection may be established with each of the one or more cameras 202. For example, one or more additional wireless transceivers may be included to communicate with the one or more cameras 202.

In some embodiments, the wireless transceiver 218 and/or the Wi-Fi transceiver 220 are operable to communicate with a cloud-based storage system 230. In some embodiments, the cloud-based storage system 230 comprises a cloud data store 232, as shown, for remotely storing data. As such, embodiments are contemplated in which video data captured by the one or more cameras 202 is transmitted to the cloud-based storage system 230 from the video recording manager device 210 and stored in the cloud data store 232. For example, in some embodiments, it may be desirable to store the video data within the cloud data store 232 to provide a redundant copy of the video data which is insured against physical destruction of the video recording manager device 210 and the one or more cameras 202. In some such embodiments, the video data may be transmitted to the cloud-based storage system 230, for example, by using the Wi-Fi transceiver 220 to transmit the video data over a wireless network.

In some embodiments, the recording and storage parameters of the one or more cameras 202 may be controlled based on various signals monitored by the video recording manager device 210. For example, in some embodiments, a sensor 206 (or a plurality of such sensors) may be used to monitor ambient conditions such that the video recording manager device 210 can provide control signals for optimizing recording based on said ambient conditions. In one example, a humidity sensor such as a hygrometer may be used to measure the amount of water vapor in the ambient air such that the recording parameters may be adjusted for recording in a foggy environment. Further still, embodiments are contemplated in which the one or more cameras 202 may include internal fans for reducing or removing condensation from the camera lens. In another example, a sensor may be included for monitoring the ambient lighting conditions. Accordingly, the video recording manager device 210 may adjust the recording parameters such as by instructing the one or more cameras 202 to switch into a night-vision recording mode. Embodiments are also contemplated in which the one or more cameras 202 may be controlled individually. For example, in some embodiments, the one or more cameras 202 include an internal controller interfacing with one or more sensors to perform any of the operations described herein with respect to the controller 216 and the sensors 206.

Additionally, embodiments are contemplated in which computer-vision techniques may be applied for monitoring video data from the one or more cameras 202. For example, in some embodiments, the video recording manager device 210 may utilize computer vision to identify objects within the video data and control recording parameters accordingly. In one example, computer-vision may determine that one of the cameras is covered by an object or obstacle such that an event scene is not visible. Based on this determination, the video recording manager device 210 may transmit a signal to the camera to adjust the recording angle to move around the obstacle or alternatively, to turn the camera off to save storage space and battery life. Further still, computer-vision techniques may be utilized to identify persons or objects of interest and focus or adjust recording parameters to ensure the persons or objects of interest are clearly visible within the video data. In some embodiments, the computer-vision techniques may be applied using any combination of additional hardware and software. For example, a computer-vision algorithm may be applied using the controller 216 to analyze the received video data. Alternatively, in some embodiments, said computer-vision techniques may be applied independently by the one or more cameras 202, for example, using a respective internal controller of each of the one or more cameras 202.

Figure 3:
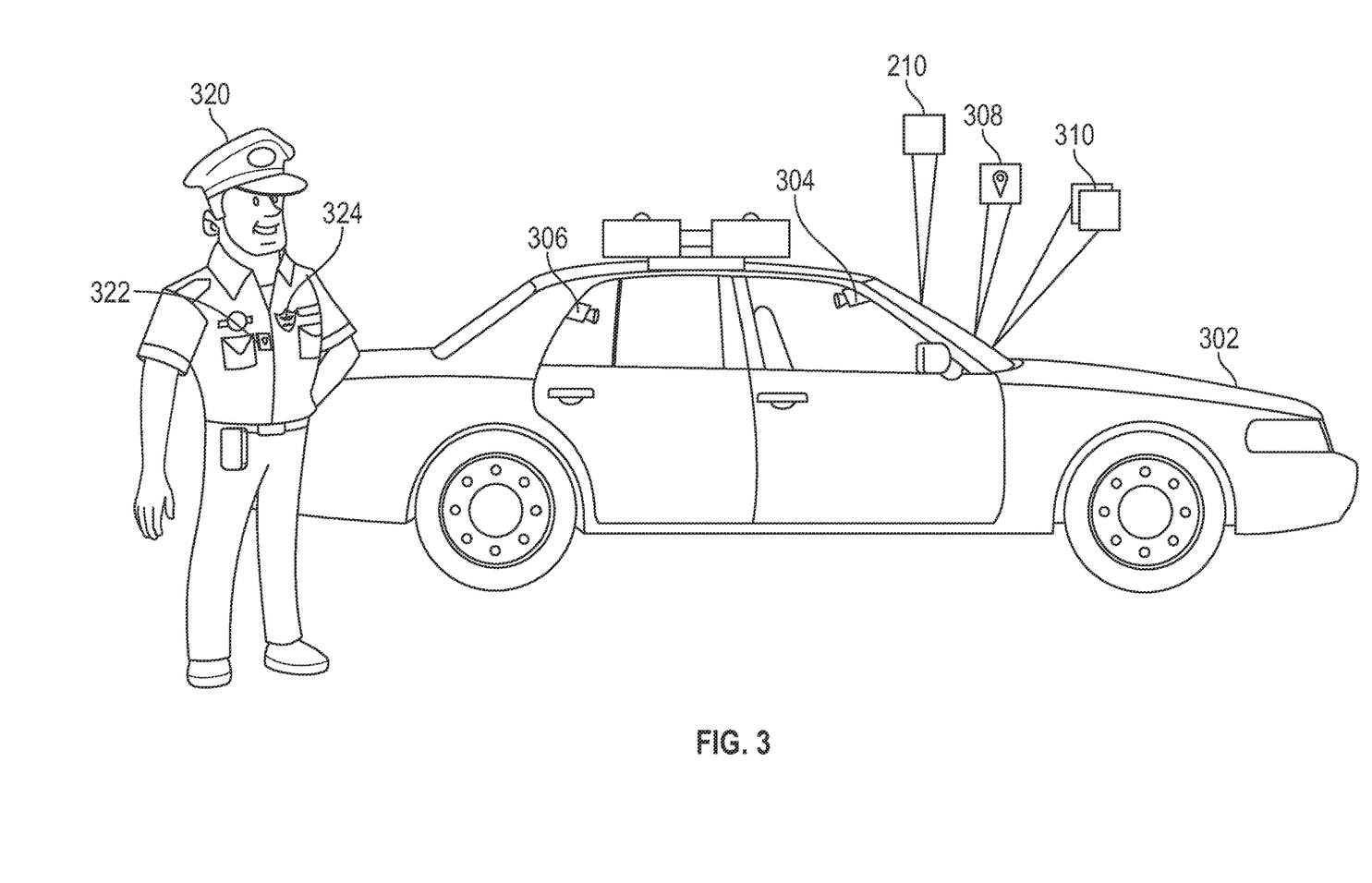
FIG. 3 depicts an exemplary operational environment relating to some embodiments of the invention.

Turning now to FIG. 3, an exemplary operational environment is depicted relating to some embodiments of the invention. In some embodiments, a vehicle 302 may be included which may be a law enforcement vehicle, as shown. In some such embodiments, the vehicle 302 may include any number of vehicle-mounted cameras, such as, for example, a front vehicle-mounted camera 304 and a rear vehicle-mounted camera 306, as shown. In some such embodiments, the front vehicle-mounted camera 304 may be rear-facing and configured to record an interior of the vehicle 302, while the rear vehicle-mounted camera 306 may be front-facing and configured to record an interior of the vehicle 302. Additionally, or alternatively, vehicle-mounted cameras may be included for recording exterior views of the vehicle 302. For example, in some embodiments, a front-facing front vehicle mounted camera may be included for recording video data in front of the vehicle. It should be understood that in some embodiments, any number of vehicle-mounted cameras may be included for recording video data at any angle respective to the vehicle 302. Further, embodiments are contemplated in which the cameras may be rotatably mounted within the vehicle 302 such that the angle may be selectable. Further still, in some embodiments, the angle of the vehicle-mounted cameras may be adjusted automatically, for example, based on instructions received from the controller 216. In some embodiments, either or both of the front vehicle-mounted camera 304 and the rear vehicle-mounted camera 306 may perform any of the actions described herein with respect to the one or more cameras 202. For example, in some embodiments, each of the front vehicle-mounted camera 304 and the rear vehicle-mounted camera 306 comprise an internal storage medium 204 configured to store recorded video data.

In some embodiments, any number of sensors may be included within the vehicle 302. In some embodiments, a GPS receiver 308 may be included for collecting location data associated with the vehicle 302. In some embodiments, one or more additional sensors 310 may be included for collected data associated with the vehicle 302 or additional data related to a triggering event. In some embodiments, the GPS receiver 308 and the one or more additional sensors 310 may be communicatively coupled to the video recording manager device 210. For example, in some such embodiments, the GPS receiver 308 and the one or more additional sensors 310 may perform similar operations as described herein with respect to the sensor 206. Embodiments are contemplated in which existing sensors of the vehicle 302 may be incorporated into the video recording system by establishing communication with the video recording manager device 210. Said communication may include any suitable forms of wireless or wired communication connections, such as, BLUETOOTH, Wi-Fi, Ethernet, USB, and other suitable communication connections.

In some embodiments, an operator 320, who may be a law enforcement officer, wears a body-mounted camera 322. For example, the body-mounted camera 322 may comprise a video camera including a clip for securing the camera to a shirt or other garment of the operator 320. In some embodiments, the operator 320 may also include a proximity tag 324. For example, the proximity tag 324 may be included within a badge of the law enforcement officer and is associated with a unique officer identifier for identifying the law enforcement officer. Accordingly, embodiments are contemplated in which the one or more additional sensors 310 include a proximity tag reader operable to read the proximity tag 324 for determining the presence of the operator 320. For example, in some embodiments, the proximity tag reader captures proximity tag data including an officer identifier which may be included within the authenticated video data. In some embodiments, the proximity tag data may be timestamped or even included within individual frames of the video data such that the video data shows when the operator is present within video data even if the operator 320 is off screen.

In some embodiments, the video recording manager device 210 is further interfaced with the electronics of the vehicle 302 such that various aspects of the vehicle 302 may be monitored in order to detect a triggering event. For example, in some embodiments, the video recording manager device 210 may receive a signal from the electronics of the vehicle 302 indicative of an airbag status, such that a triggering event can be associated with deployment of the airbags. It should be understood that various other vehicle-specific parameters may be monitored and potentially associated with triggering events.

It should be understood that, though embodiments of the invention are described above as relating to law enforcement, additional embodiments are contemplated that relate to other operational environments. For example, in some embodiments, the video recording/authentication systems and methods described herein may be employed for general security recording and surveillance applications. As such, said systems may include any number of cameras, which may be vehicle-mounted, body-mounted, or mounted onto stationary structures such as buildings. Further, embodiments may be employed for monitoring delivery operations and other services.

Figure 4:
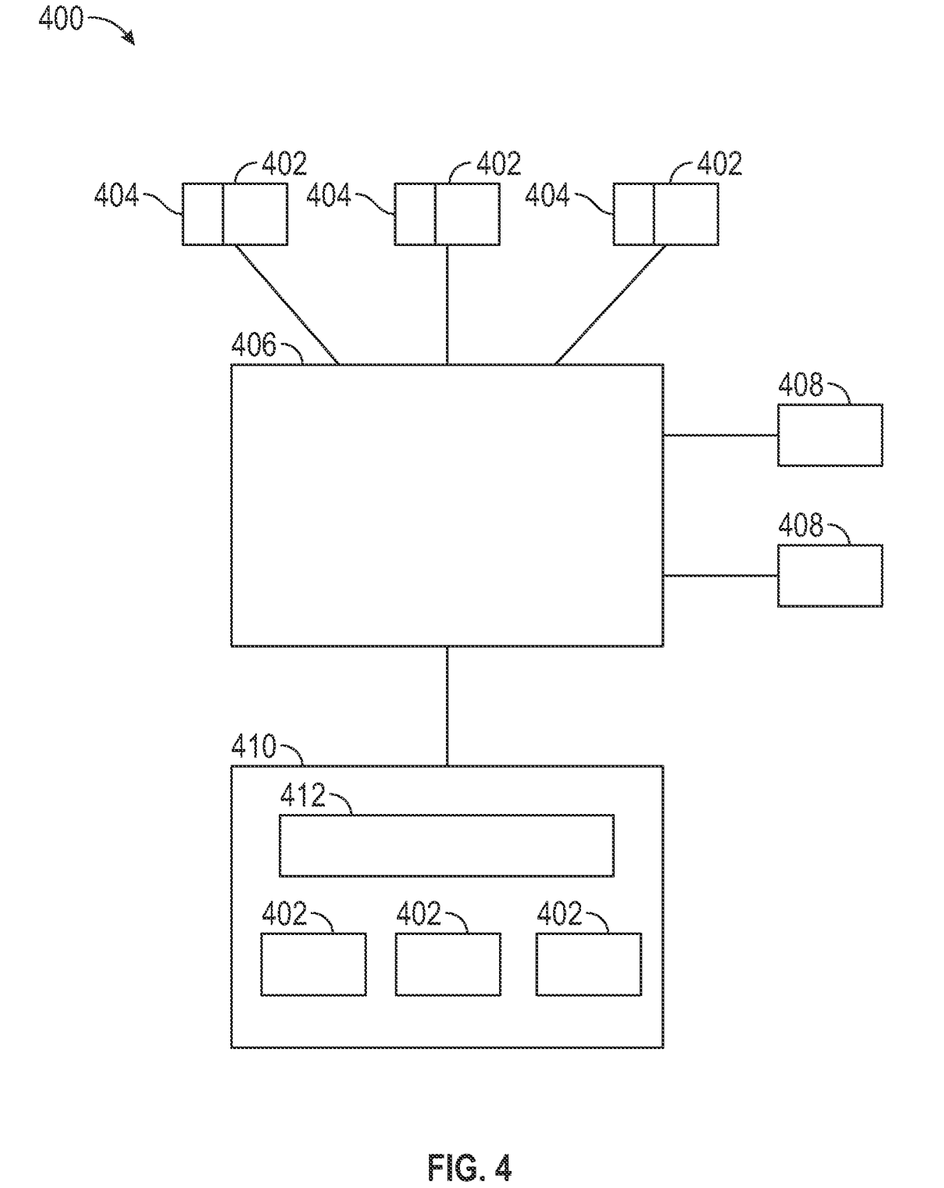
FIG. 4 depicts an exemplary video recording diagram relating to some embodiments of the invention.

Turning now to FIG. 4, an exemplary video recording diagram 400 is depicted relating to some embodiments of the invention. In some embodiments, one or more sets of individual video data 402 paired with individual video metadata 404 are received at a combiner 406, as shown. In some embodiments, the combiner 406 may be included within the video recording manager device 210. For example, in some embodiments, the controller 216 may be operable to perform the combining operations described herein with respect to the combiner 406. In some such embodiments, each of the sets of individual video data 402 are received from a respective one of the one or more cameras 202. Accordingly, the individual video metadata 404 may include an identifier associated with the respective camera such that the individual video metadata 404 may be used to identify the particular camera of the one or more cameras 202 that recorded the individual video data 402.

In some embodiments, the combiner 406 also receives one or more sets of sensor data 408 from one or more respective sensors. The combiner 406 is configured to combine the one or more sets of individual video data 402 and the one or more sets of sensor data 408. In some embodiments, the combiner 406 combines multiple streams of video data and sensor data in real time, such that live streams are combined as they are recorded by the one or more cameras 202. Alternatively, in some embodiments, the video data may be combined after completion of the triggering event. For example, the video data may be combined directly after completion of the triggering event responsive to a completion indication or at a later time such as, an hour, a day, a week, or another suitable period of time after the triggering event. Further, in some embodiments, the video data may be combined at any time in response to a manual combination request submitted by a user.

In some embodiments, the combiner 406 outputs a set of composite authenticated video data 410, as shown. Here, the composite authenticated video data 410 comprises authentication metadata 412 and the one or more sets of individual video data 402 received from the one or more cameras 202. In some embodiments, the authentication metadata includes any of the sensor data 408, a triggering event indication, a time stamp, a user identifier, one or more digital signatures, as well as other data suitable to authenticate the video data. In some embodiments, a digital signature may be added to each set of individual video data 402 (for example, within the individual video metadata 404 corresponding to the individual video data 402) to identify the camera which recorded the individual video data 402. Further, in some embodiments, a digital signature associated with the video recording manager device 210 may be included within the authentication metadata 412 to identify the video recording manager device 210. In some such embodiments, the digital signature may include a unique identifier corresponding to the video recording manager device 210. In some embodiments, additional digital signatures may be included for identifying the sensor 206.

Figure 5:
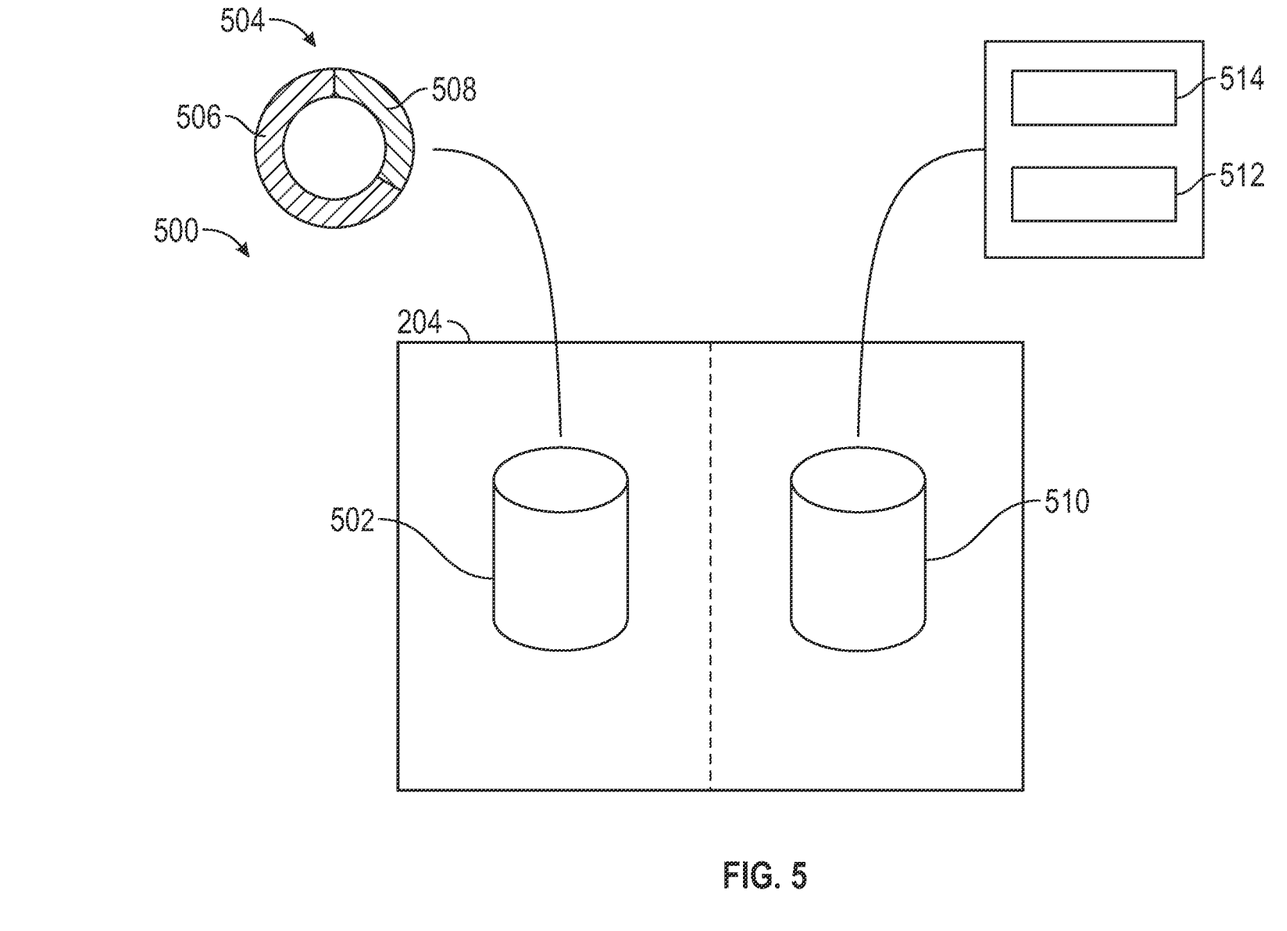
FIG. 5 depicts an exemplary storage diagram relating to some embodiments of the invention.

Turning now to FIG. 5, an exemplary storage diagram 500 is depicted relating to some embodiments of the invention. In some embodiments, the internal storage medium 204 of the one or more cameras 202 may be partitioned, as shown. Here, the internal storage medium 204 may include a first portion 502, which in some embodiments, includes a circular storage buffer 504, as shown. The circular storage buffer 504 is configured to continuously store video data by overwriting previously stored video data 506 with new video data 508. In some embodiments, the circular storage buffer 504 comprises a temporary first-in-first-out storage procedure operable to store up to one week or 168 hours of video data. However, embodiments are contemplated in which different sizes of storage media may be used that may store varying amounts of video data.

It should be understood that the amount of video data that can be stored depends further on the specific recording parameters of the video data. For example, a set of video data with a resolution of 2160 pixels (2160p or 4K) or 1080 pixels (1080p) may require significantly more storage than video data with a lower resolution. Thus, a similar storage device may be operable to store about 168 hours of standard quality video data at a resolution of 720 pixels (720p) or about 70 hours of higher quality video data at a resolution of 1080p. Further still, embodiments are contemplated in which a combination of video data at multiple resolutions may be stored.

In some embodiments, the internal storage medium 204 further comprises a second portion 510. Here, the second portion 510 may be configured to store triggering event related video data 512 along with authentication metadata 514. In some embodiments, the triggering event related video data 512 may be received from the video recording manager device 210. For example, in some embodiments, the composite authenticated video data 410 may be communicated back to the one or more cameras 202 and stored within the internal storage medium 204 of each camera. Alternatively, in some embodiments, the triggering event related video data 512 may comprise video data transferred from the circular storage buffer 504 based on a received triggering event signal. For example, in some embodiments, the internal storage medium 204 may be configured to automatically transfer a portion of the video data in the circular storage buffer 504 to the second portion 510 responsive to receiving a triggering event signal. Accordingly, the video data leading up to a triggering event indication may be captured and preserved within the triggering event related video data 512. In some embodiments, the triggering event related video data 512 comprises video data captured prior to receiving the triggering event indication, as well as video data recorded for a predetermined period of time after receiving the triggering event indication. In some embodiments, the predetermined period of time may be adjusted based on a type of triggering event.

Additionally, embodiments are contemplated in which alternative storage procedures may be included. For example, in some embodiments, video data may be continuously recorded at a high video quality such as a resolution of 1080p or 4K. Here, the high-quality video data may be stored within the circular buffer for a predetermined period of time. If a triggering event occurs at least a portion of the high-quality video data may be transmitted to the video recording manager device 210. Alternatively, if no triggering event occurs over the predetermined period of time, the high-quality video data may be deleted or converted into a lower quality to increase storage availability. For example, the video data may initially be stored at the resolution of 1080p or 4K and after an hour be converted to a resolution of 720p or lower such that the video data occupies less storage space in the internal storage medium 204 of the one or more cameras 202. By initially storing video data at a high quality, the video data may be retroactively captured as event data leading up to a triggering event while maintaining high video quality. Further, since the high-quality storage may only be temporary, additional benefits in terms of storage capacity are achieved. Further still, embodiments are contemplated in which the predetermined time period for temporarily storing high-quality video data may be determined based at least in part on the remaining storage capacity or a signal received from the video recording manager device 210, such that, if storage is available high-quality video data may be captured and maintained. Accordingly, all of the available storage space may be utilized based on availability such that the storage is optimized for various recording environments.

In some embodiments, the one or more cameras may be configured to continuously record video data at a lower video quality with a lower resolution and lower bit rate to reduce the data resources used. Here, a higher video quality with a higher resolution and higher bit rate may be used while recorded event-related video data to increase the video quality of the event-related video data. In some embodiments, various other resolutions and bit rates may be used. For example, in some embodiments, a 4K resolution may be used to record at a higher video quality, while a pixel resolution of 720p or 1080p may be used for a lower video quality. Alternatively, in some embodiments, a single video quality may be used for both continuous recording and event-related recording.

Figure 6:
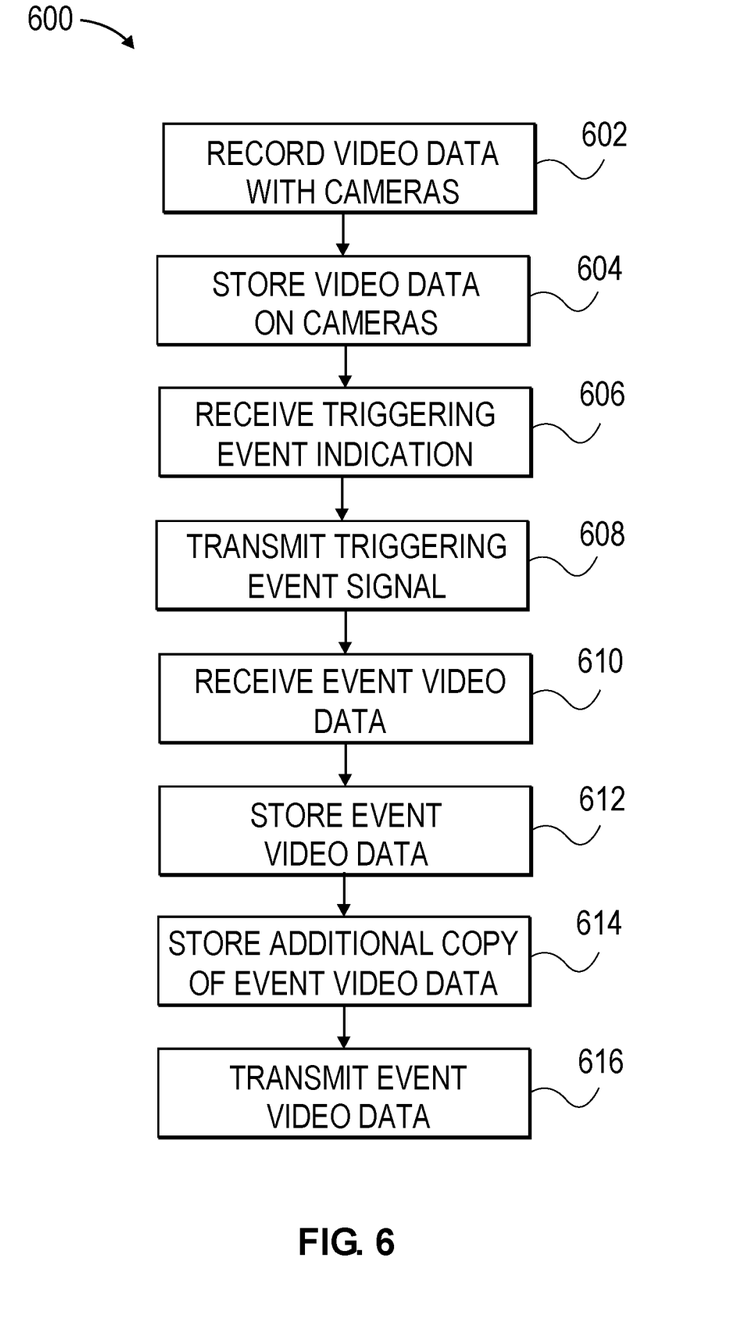
FIG. 6 depicts an exemplary method for authenticatable redundant video recording and storage relating to some embodiments of the invention.

Turning now to FIG. 6, an example of a method 600 for authenticatable redundant video recording and storage is depicted relating to some embodiments of the invention. It should be understood that, in some embodiments, any of the steps described herein with respect to method 600 may be executed on at least one processor. For example, in some embodiments, at least a portion of the steps may be carried out by a processor associated with the controller 216 of the video recording manager device 210. Additionally, embodiments are contemplated in which processing may be split between two or more processors with a first processor performing a first portion of steps and a second processor performing a second portion of steps.

At step 602, video data is recorded at the one or more cameras 202. In some embodiments, the video data is continuously recorded at each camera. Further, in some embodiments, the video data further comprises audio data recorded by one or more microphones associated with each respective camera. In some embodiments, continuously recording video data allows the preservation of video footage leading up to a triggering event.

At step 604, the recorded video data is stored on each of the one or more cameras 202. In some embodiments, the video data may be stored within the internal storage medium 204 of each camera. Further, in some embodiments, the circular storage buffer 504 may be used to continuously record video data from each respective camera.

At step 606, a triggering event indication is received from at least one sensor, such as sensor 206. In some embodiments, the triggering event indication may comprise sensor data received from the sensor 206, which is monitored by the video recording manager device 210. Accordingly, embodiments are contemplated in which the sensor 206 does not identify or classify the sensor data as including a triggering event indication. Instead, in such embodiments, the sensor 206 provides raw sensor data to the video recording manager device 210 and the video recording manager device 210 determines whether the raw sensor data comprises a triggering event indication. Alternatively, or additionally, in some embodiments, the sensor 206 may be operable to identify triggering event indications. Further still, embodiments are contemplated in which the triggering event indication may be received manually by an operator. For example, the sensor 206 may comprise a button or other interface element operable to receive an input which provides a triggering event indication. For example, an operator may manually opt to initiate a triggering event by providing such an input, which may be received in proximity to the video recording manager device 210 or may be received remotely. For example, embodiments are contemplated which allow a remote operator to transmit a triggering event indication input over a network to the video recording manager device 210.

At step 608, a triggering event signal is transmitted from the video recording manager device 210 to the one or more cameras 202. In some embodiments, the triggering event signal is transmitted in response to receiving the triggering event indication from the at least one sensor. For example, when the video recording manager device 210 receives sensor data which is indicative of a triggering event the video recording manager device 210 transmits the triggering event signal such that a triggering event procedure is initiated within the system. In some embodiments, the triggering event signal changes the operation and/or recording parameters of the one or more cameras 202. In some embodiments, the triggering event signal requests video data from the one or more cameras 202.

In some embodiments, the triggering event signal is operable to control video recording parameters of the one or more cameras 202. For example, in some embodiments, the triggering event signal instructs the one or more cameras 202 to switch from a standard continuous recording mode to a triggering event recording mode that may be associated with higher quality recording parameters. In some embodiments, the triggering event signal adjusts one or more recording parameters of the one or more cameras 202, such as, any of a video resolution, a frame rate, a shutter speed, as well as other recording parameters. In some embodiments, it may be desirable to increase video recording quality for a certain duration of time associated with a triggering event, such that the aspects of the event are suitably captured.

At step 610, triggering event related video data is received from the one or more cameras 202 at the video recording manager device 210. In some embodiments, the triggering event related video data comprises any combination of previously recorded video data from before receiving the triggering event indication, post-recorded video data from after receiving the triggering event indication, and live recorded video data received in real time directly after being recorded by the one or more cameras 202. In some embodiments, the one or more cameras 202 are configured to provide the triggering event related video data responsive to receiving the triggering event signal from the video recording manager device 210. In some embodiments, the triggering event related video data comprises at least a portion of the video data stored within the internal storage medium of the one or more cameras 202. For example, in some embodiments, a portion of the video data stored using the circular storage buffer 504 corresponding to a predetermined period of time before the triggering event was received may be transmitted to the video recording manager device 210 as triggering event related video data. In one example, video data for 5 minutes of video data leading up to the time a triggering event signal is received is included within the triggering event related video data and is redundantly stored across a plurality of storage devices.

At step 612, the triggering event related video data is stored by the video recording manager device 210. In some embodiments, the triggering event related video data is stored within a first storage medium 212 of the video recording manager device 210. In some embodiments, the stored triggering event related video data may comprise the composite authenticated video data 410 including authentication metadata 412 and one or more sets of individual video data 402.

In some embodiments, the triggering event related video data further comprises additional metadata relating to the triggering event. For example, the video data may be augmented with metadata including sensor data captured during the triggering event. In some embodiments, event related metadata may be included within frames of the video data. Accordingly, it may be possible to augment video frames with dynamic data. For example, location data or other sensor data may be continuously or periodically updated and recorded over time within the video frames. In some embodiments, it may be desirable to only augment certain frames of the video data with sensor data. For example, every tenth frame may be augmented or frames may be augmented once a second or once a minute. Further, in some embodiments, certain types of sensor data may be updated and augmented into video frames more frequently. For example, location data may be augmented into the video frames once a minute, while acceleration data may be augmented into the video data once a second.

At step 614, an additional copy of the triggering event related video data may be stored by the video recording manager device 210. In some embodiments, the additional copy may be stored in the second storage medium 214 of the video recording manager device 210. As described above, in some embodiments, the second storage medium 214 may be removable from the video recording manager device 210. In some embodiments, the additional copy of the triggering event related video data may be identical to the first triggering event related video data stored at step 612. Embodiments are contemplated in which the original triggering event related video data and the additional copy may be compared to ensure that neither version of the video data has been tampered with or altered. In some embodiments, it may be desirable to distribute copies of the video data between multiple different entities such that copies of the data from one entity may be compared to other copies to verify authenticity. Accordingly, embodiments are contemplated in which the triggering event related video data is compared to the additional copy to authenticate the triggering event related video data as evidence, for example, in a legal proceeding.

In some embodiments, redundant copies of the triggering event related video data further provide evidence capture assurance insuring against physical damage to any of the storage mediums. Embodiments of the invention provide further benefit because the triggering event related data may be stored across physically distributed storage media. For example, the one or more cameras 202 may be positioned in a separate location from the video recording manager device 210 such that if the video recording manager device 210 is damaged the video data is still available within the internal storage medium of the one or more cameras 202. Additionally, the second storage medium 214 of the video recording manager device 210 may be removable such that additional copies of the video data may be removed from the video recording manager device 210 and transported to another location.

At step 616, the triggering event related video data including the authentication metadata is transmitted to the cloud-based storage system 230. In some embodiments, the triggering event related video data may be transmitted upon completion of a triggering event recorded procedure after all of the triggering event related video data has been recorded. Alternatively, in some embodiments, the triggering event related video data may be transmitted to the cloud-based storage system 230 as it is received and as a suitable communication connection is available. For example, in some embodiments, the video recording manager device 210 may monitor the quality of a communication connection over a network to determine when the triggering event related video data should be transmitted. Further, embodiments are contemplated in which the triggering event related video data is transmitted after a certain amount of triggering event related video data has been recorded. For example, the triggering event related video data may be transmitted after 300 megabytes of data have been captured. It should be understood that, in some embodiments, the example of 300 megabytes given may be arbitrary and that other data amounts are also contemplated.

Transmitting the triggering event related video data to external storage systems such as the cloud-based storage system 230 provides further evidence capture assurance by persisting the video data remotely such that damage to any other storage media will not result in total loss of the video data, which in some cases, may include important video evidence. Further, embodiments are contemplated in which the video data may be published to online resources or the like to persist yet another copy of the video data distributed to various online databases.

In some embodiments, a video signature may be associated with the event-related video data that may be sent, for example, to cloud-based storage system 230 as soon as possible. In some embodiments, the video signature may comprise a unique identifier, hash, or checksum of the associated video data, which may be used to confirm that the video data has not been altered. In some embodiments, comparing video signatures may be much faster and less resource intensive than, for example, comparing the video data itself, as described above. In some embodiments, said video signature comprises a hash on the video data which ensures that the video data has not been altered after recording. In some such embodiments, the hash is generated for the video as soon as the video recording is closed. Said hash may be configured such that the hash will be altered, destroyed, or changed in some way if the video data is altered. In some embodiments, the hash may be included within the authentication metadata for the video data. In some embodiments, a cellular connection may be used to upload the hash and trigger information indicative of the triggering event within seconds of recording a video. In some embodiments, time stamps may be generated for various operations within the recording and storage process. For example, a first time stamp may be generated for when the recording of a set of video data is closed and a second time stamp may be generated for when any combination of the hash, the trigger information, and the metadata arrives at a secure data storage, such as, for example, the cloud-based storage system 230. Accordingly, further assurance that the video has not been altered may be deduced from determining that there was not sufficient time to alter the video data between a time when recording ended to a time when the video data or its associated metadata or hash is stored within a secure data store. Further, if the hash of a set of video data matches the hash stored within the secure data store the set of video data is confirmed to be unaltered.

It should be understood that, in some embodiments, any number of the steps described herein with respect to method 600 may be performed simultaneously or in a different order than as explicitly described herein. Further, certain steps may be optional or removed entirely. For example, in some embodiments, the triggering event related video data may not be transmitted to the cloud-based storage system 230. Further still, certain steps of the method 600 may be repeated or may be performed continuously. For example, step 602 of recording video data may be performed continuously as other steps are performed.

In some embodiments, redundant copies of the triggering event related video data may be persisted until a confirmation is received that the triggering event related video data has been successfully received and stored at the cloud-based storage system 230. Here, overwriting or deletion of the triggering event related video data may be prevented until it is confirmed that the triggering event related video data has been stored elsewhere, such as on the cloud data store 232. For example, the cloud-based storage system 230 may receive the triggering event related video data and store the triggering event related video data within the cloud data store 232 before responding with a confirmation message or confirmation signal. In some embodiments, after receiving the confirmation message or confirmation signal the video recording manager device 210 may allow the redundant copies of the triggering event related video data to be deleted to make additional storage capacity available for subsequent triggering events.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A video recording manager device comprising:
   a communication connection to one or more cameras associated with the video recording manager device, the communication connection configured to receive triggering-event-related video data from the one or more cameras;
   a controller configured to control one or more video recording parameters;
   a first storage medium storing the triggering-event-related video data received from the one or more cameras, the triggering-event-related video data including at least a portion stored in a circular storage buffer of the first storage medium that is recorded prior to receiving a triggering event indication and authentication metadata associated with the triggering event indication for authenticating the triggering-event-related video data,
   wherein the triggering event indication is provided by one or more sensors in response to the one or more sensors detecting a trigger,
   wherein the one or more sensors are communicatively coupled to the video recording manager device and comprise a humidity sensor, and
   wherein the authentication metadata comprises proximity tag data associated with a proximity tag reader; and
   a wireless transceiver configured to transmit the triggering-event-related video data including the authentication metadata over a wireless network to a second storage medium.

2. The video recording manager device of claim 1, further comprising:
   an additional storage medium storing an additional copy of the triggering-event-related video data received from the one or more cameras, wherein the additional storage medium is removable from the video recording manager device.

3. The video recording manager device of claim 1, wherein the second storage medium comprises a cloud-based storage system.

4. The video recording manager device of claim 1, further comprising:
   an additional communication connection to the one or more sensors configured to receive the triggering event indication from the one or more sensors.

5. The video recording manager device of claim 1, further comprising:
   a user input configured to receive the triggering event indication manually from a law enforcement officer.

6. The video recording manager device of claim 1, further comprising:
   a computer-vision algorithm stored on the video recording manager device, wherein the controller is configured to execute the computer-vision algorithm and adjust the one or more video recording parameters responsive to the computer-vision algorithm.

7. The video recording manager device of claim 6, wherein adjusting the one or more video recording parameters comprises transmitting a signal to the one or more cameras that instructs a recording angle adjustment of the one or more cameras responsive to the computer-vision algorithm determining that an object of interest is not visible.

8. A video recording system comprising:
   one or more cameras configured to continuously record video data including triggering-event-related video data; and
   a video recording manager device comprising:
      a communication connection to the one or more cameras, the communication connection configured to receive the triggering-event-related video data from the one or more cameras;
      a first storage medium comprising a circular storage buffer, the first storage medium operable to store the triggering-event-related video data received from the one or more cameras, the triggering-event-related video data including at least a portion recorded prior to receiving a triggering event indication stored in the circular storage buffer; and a second storage medium operable to store a redundant copy of the triggering-event-related video data including authentication metadata; and one or more sensors communicatively coupled to the video recording manager device, the one or more sensors configured to provide the triggering event indication responsive to detecting a trigger, wherein the one or more sensors comprises a humidity sensor.

9. The video recording system of claim 8, wherein the second storage medium is removable from the video recording manager device.

10. The video recording system of claim 8, wherein the one or more sensors comprises a radio frequency identifier (RFID) tag reader.

11. The video recording system of claim 8, wherein the one or more sensors comprises a global positioning system (GPS) receiver.

12. The video recording system of claim 8, wherein the video recording manager device is configured to adjust at least one video recording parameter responsive to a humidity from the humidity sensor.

13. The video recording system of claim 8,
wherein the second storage medium is configured to transmit a confirmation message confirming storage of the triggering-event-related video data; and
wherein the redundant copy of the triggering-event-related video data is deleted by the video recording manager device upon receiving the confirmation message.

14. A video recording manager device comprising:
a communication connection to one or more cameras associated with the video recording manager device, the communication connection configured to receive triggering-event-related video data from the one or more cameras,
wherein the video recording manager device is configured to be mounted in a law enforcement vehicle;
a storage medium storing the triggering-event-related video data received from the one or more cameras, the triggering-event-related video data including at least a portion stored in a circular storage buffer of the storage medium recorded prior to receiving a triggering event indication,
wherein the triggering event indication is associated with activation of flashing emergency lighting of the law enforcement vehicle,
wherein the triggering-event-related video data comprises authentication metadata for authenticating the triggering-event-related video data,
wherein the circular storage buffer uses a temporary first-in-first-out storage procedure; and
a wireless transceiver configured to transmit the triggering-event-related video data including the authentication metadata over a wireless network to a cloud-based storage system.

15. The video recording manager device of claim 14, wherein the circular storage buffer is operable to store up to 168 hours of video data.

16. The video recording manager device of claim 14, further comprising:
a removable storage medium configured to store a redundant copy of the triggering-event-related video data.

17. The video recording manager device of claim 14, wherein the video recording manager device is coupled to a global positioning system (GPS) receiver of the law enforcement vehicle.

18. The video recording manager device of claim 14, wherein the one or more cameras include a body-mounted camera.

19. The video recording manager device of claim 14, wherein at least one of the one or more cameras comprises a vibration-dampening mounting structure.

20. The video recording manager device of claim 14, wherein a triggering event is initiated by a driver monitoring parameter and wherein the driver monitoring parameter includes using a cell phone, not wearing a seatbelt, or falling asleep.

* * * * *